(12) United States Patent
Shi

(10) Patent No.: US 7,948,955 B2
(45) Date of Patent: May 24, 2011

(54) SUBSCRIPTION METHOD AND DEVICE

(75) Inventor: Youzhu Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 785 days.

(21) Appl. No.: 12/017,423

(22) Filed: Jan. 22, 2008

(65) Prior Publication Data

US 2008/0113669 A1     May 15, 2008

Related U.S. Application Data

(63) Continuation of application No. PCT/CN2006/001806, filed on Jul. 21, 2006.

(30) Foreign Application Priority Data

Jul. 22, 2005    (CN) .......................... 2005 1 0028074

(51) Int. Cl.
    *H04Q 7/24*       (2006.01)
    *H04Q 7/20*       (2006.01)
    *H04L 12/28*      (2006.01)

(52) U.S. Cl. ...................... 370/338; 370/353; 370/395.1; 455/435.1; 709/225

(58) Field of Classification Search .................. 370/229, 370/328, 335–338, 352–356, 395.1; 455/435.1, 455/435.2, 456.1; 709/206, 225, 229; 719/318
See application file for complete search history.

(56) References Cited

U.S. PATENT DOCUMENTS

| | | |
|---|---|---|
| 2004/0002988 A1 | 1/2004 | Seshadri et al. |
| 2004/0184452 A1* | 9/2004 | Huotari et al. ................ 370/384 |
| 2004/0255302 A1* | 12/2004 | Trossen ........................ 719/318 |
| 2005/0060720 A1 | 3/2005 | Mayer |

(Continued)

FOREIGN PATENT DOCUMENTS

EP     1 051 019 A2    11/2000

OTHER PUBLICATIONS

International Search Report—Mailed Nov. 9, 2006.

(Continued)

*Primary Examiner* — Afsar M. Qureshi
(74) *Attorney, Agent, or Firm* — Ladas & Parry LLP

(57) ABSTRACT

A subscription method and device based upon the session initiation protocol are disclosed, such that a function of permanent subscription and temporary subscription is achieved, and a time at which a notification is sent can be customized. In the present invention, a mechanism of permanent subscription and temporary subscription is introduced. Upon reception of a SUBSCRIBE message, a notifier sets a temporary subscription flag or a permanent subscription flag for a subscriber according to an identifier carried in the message or service characteristic corresponding to a subscribed event. In the case of the permanent subscription flag, a NOTIFY message from the notifier is continuously sent until the subscriber or the system revokes subscription, and in the case of the temporary subscription flag, the notifier no longer sends a NOTIFY message upon finishing of a subscribed service. The subscriber may also carry a parameter indicative of a start time at which subscription gets validated and/or a parameter indicative of a time at which a notification is sent in the SUBSCRIBE message sent to the notifier. The notifier parses the message and sends the NOTIFY message to the subscriber when the start time at which subscription gets validated is reached and/or according to the time at which a notification is sent.

23 Claims, 3 Drawing Sheets

U.S. PATENT DOCUMENTS

2006/0187937 A1* 8/2006 Townsley et al. ........ 370/395.53
2007/0118604 A1* 5/2007 Costa Requena ............. 709/206

OTHER PUBLICATIONS

Niemi Nokia Research Center A; "Session Initiation Protocol (SIP) Event Notification Extension for Notification Throttling; draft-niemi-sipping-event-throttle-03.txt", IETF Standard-Working-Draft, Internet Engineering Task Force, IETF, Ch, No. 3, Jul. 18, 2005, XP015040301 ISSN: 0000-0004 Section 1, Section 3.2, Section 3.4, Section 4.2.1, Section 4.2.2, Section 5.2.

Khartabil Hisham, et al; "[Sip] RE:[Simple]-05 Message and Expires header"IETF Mail-Archive Jul. 24, 2002, XPXP007912513 Retrieved from the Internet:URL:www.ietf.org/mail-archive/web/sip/current/msg06090.html [retrieved on Apr. 7, 2010].

European Search Report EP 09 16 0916.

The $2^{nd}$ Office Action regarding the European Counterpart Appln. 06761541.9.

The European Search Report and $1^{st}$ Office Action regarding the European Counterpart Appln. 09160916.4.

The English Translation of Written Opinion of the International Search Authority.

J. Rosenberg; "A Presence Event Package for the Session Initiation Protocol (SIP); rfc3856.txt" IETF Standard, Internet Engineering Task Force, IETF, Ch. 1 Aug. 2004, XP015009634 ISSN: 0000-0003.

A.B. Roach; "Session Initiation Protocol (SIP)-Specific Event Notification; rfc3265.txt" IETF Standard, Internet Engineering Task Force, IETF, Ch, Jun. 1, 2002, XP015009043, ISSN:0000-0003.

J. Rosenberg, et al; "SIP: Session Initiation Protocol", Network Working Group Request for Comments: 3261, Jun. 1, 2002, pp. 1-269, XP015009039.

European Search Report dated Oct. 8, 2008; Application No./Patent No. 06761541.9—1244/1909434 PCT/CN2006001806.

\* cited by examiner

SUBSCRIPTION METHOD AND DEVICE

CROSS-REFERENCE TO RELATED APPLICATIONS

This application is a continuation of International Application NO. PCT/CN2006/001806, filed Jul. 21, 2006, which claims the priority of Chinese Application No. 200510028074.7, filed Jul. 22, 2005, the content of both of which is incorporated herein by reference.

FIELD OF THE INVENTION

The present invention relates to the field of subscription technologies and in particular to a subscription method and device based upon the Session Initiation Protocol ("SIP").

BACKGROUND OF THE INVENTION

The session initiation protocol is a standard for the Voice over Internet Protocol ("VoIP"), which was published by the Internet Engineering Task Force ("IETF") in March, 1999.

The SIP signaling protocol is adapted to initiate, manage and terminate voice and video sessions in a packet network and particularly to generate, modify and terminate a session of a participant or between the participants. The SIP is one of components constituting a multimedia data and control architecture of the IETF and is associated with numerous other protocols from the IETF, such as the Real time Transfer Protocol ("RTP"), the Session Description Protocol ("SDP"), etc.

The SIP primarily provides five functions related to session establishment and termination:

(1) User locating: a decision of a terminal system for communication;

(2) User availability: a decision of willingness of a called party participating in communication;

(3) User capability: a decision of media and media parameters in use;

(4) Session establishment: "ringing", setting up of session parameters for calling and called parties; and (5) Session management: including session transfer and termination, session parameter modification, service invocation, etc.

The SIP involves two types of messages:

(1) Request: messages sent from a client to a server; and (2) Response: messages sent from a server to a client.

Particularly, the request messages include:

INVITE: initialize a call;

ACK: acknowledge the final reply for INVITE;

BYE: terminate a call;

CANCEL: revoke searching and ringing;

OPTIONS: inquiry about capabilities of another part;

REGISTER: register for a location service;

INFO: send information during a session without changing the session status;

PRACK: function the same as ACK but for a temporary response;

SUBSCRIBE: subscribe to a remote terminal for a notification of change of the status of the remote terminal;

NOTIFY: notify a subscriber of change of the status subscribed by the subscriber;

UPDATE: allow a client to update parameters of a session without influencing the current status of the session;

MESSAGE: achieve an instant message through loading contents of the instance message into a request body of MESSAGE; and REFER: instruct a receiver to contact a third party dependent upon information on a contact address provided in a request.

The response messages include digital response codes. A set of response codes in the SIP is partially based upon Hyper Text Transport Protocol (HTTP) response codes. There are two types of responses:

A temporary response (1XX): adapted to indicate a process by a server, but not to terminate an SIP transaction; and A final response (2XX, 3XX, 4XX, 5XX, 6XX): terminate an SIP transaction.

Each SIP message consists of the following three parts:

(1) Start Line: each SIP message starts with the Start Line. The Start Line conveys the type of the message (a method type in a request and a response code in a response) and the version of the protocol. The Start Line can be a request line (for a request) or a status line (for a response).

(2) SIP Header: it is adapted to transport the attribute of the message and to modify the meaning of the message. It is identical to an HTTP header field in syntax and semantic (actually some headers are derived from the HTTP) and is always in a format of <Name>:<Value>.

(3) Message Body: it is adapted to describe an initiated session (for example, an audio and video coding type, a sampling rate, etc. are included in a multimedia session). The Message Body can be presented in a request and a response. The SIP distinguishes clearly signaling information transported in the SIP Start Line and the SIP Header from session description information beyond the SIP. An available body type may include the SDP later described in the context.

From the year of 1999 on, the essential SIP protocol has been developed from the initial RFC 2543 to the current RFC 3261 with both greatly extended protocol contents and a more improved signaling framework. Using the SIP to only accomplish a basic call control is no longer satisfactory, and more attention is paid to how to use the SIP to implement added-value services flexibly.

A SUBSCRIBE/NOTIFY mechanism has been presented in the SIP protocol so that an entity (subscriber) in a network may subscribe for status information of a resource or call in the network. When the status of the subscribed resource changes, a network entity (notifier) responsible for the resource can send to the subscriber a notification which notifies about the current change of the status of the resource. Here, the subscriber initiates via an SIP SUBSCRIBE message to the notifier a request for subscribing to an event, and the notifier returns a subscription notification via an SIP NOTIFY message.

When an event is subscribed successfully, both the subscriber and the notifier create their respective subscription instances for the subscribed event. The subscribed event is provided with a lifetime period determined by both a value of Expires in the SUBSCRIBE/NOTIFY message and a lifetime period of a current SIP session identifier. When the value of Expires is reached, the subscriber is required to resend a SUBSCRIBE message so as to refresh the subscription instance if the subscriber wishes continuous acquisition of notification of the subscribed event. If the lifetime period of the current SIP session identifier is ended, e.g. the subscriber goes offline, the lifetime period of the subscription instance will be ended as well. The subscriber is required to send a SUBSCRIBE message with a value of Expires being "0" if the subscriber wishes to revoke the subscription before the lifetime period of the subscription instance is ended.

In practical applications, the following issues may exist in the above solutions. When a user wishes to initiate a permanently valid subscription, a terminal of the user (subscriber) is required to stay online all the time. For example, a user with subscription to a voice mail box may wish to be notified about a new voice message provided that the mail box is valid. In the prior art, however, a subscription instance will be ended if the user goes offline. A demand for a scenario of permanent subscription can be satisfied only if a request for subscribing to a voice message event is initiated from the user in his own initiative or automatically from the user terminal capable of recognizing the attempt of the user (for permanent subscription) when the user gets online again, which means an additional requirement on both the user and the user terminal, let alone the absence in the SIP protocol of a method for the user terminal to recognize the attempt of the user for permanent subscription.

Further, if the user wishes to initiate a temporarily valid once subscription, subscription will be revoked automatically upon finishing a service for a subscribed event. It may be difficult for the user terminal to set a specific value for the period of subscription. For example, the user who receives an anonymous malicious call subscribes to a network device for a malicious call tracing event. Here, the user subscribes for a current status of the subscribed event (an identifier of a caller initiating the malicious call) instead of change of a status. And, the notifier itself may not know the identifier of the caller initiating the malicious call, either, and is required to request another network element in turn. Therefore, there may be an indeterminate interval from reception of subscription by a notifier to sending of a notification from the notifier, so that it may be even more difficult for the user to set a value for the period of subscription. If the value for the period of subscription is set too small, a subscription failure may occur in that a created subscription instance may have already be invalidated when the user terminal receives a subscribed notification. If the value is set too large, the subscriber and the notifier may have to perform an additional process in that the subscription instance may be still valid even if the call is released.

Further, since the current SUBSCRIBE/NOTIFY mechanism offers no subscription based upon a time policy, the user can not initiate any subscription specifying a start time at which a subscription instance gets validated and a time at which a subscribed notification is sent. For example, the user will be out for business three days later, and wishes subscription to a weather forecast of the following three days regarding the city for business. In other words, a service provider will start sending to the user the weather forecast three days later. For another example, the user with subscription to a weather forecast wishes that the service provider would send the weather forecast at his own specified time because the sending time of the service provider does not comply with his life schedule. The current SUBSCRIBE/NOTIFY mechanism can not meet such demands of the user.

SUMMARY OF THE INVENTION

A subscription method and device based upon the session initiation protocol is provided, so that permanent subscription and temporary subscription may be achieved.

A subscription method and device based upon the session initiation protocol is provided, which is capable of specifying a time policy for sending of a subscribed notification.

According to an embodiment of the present invention, a subscription method includes:

receiving, by a notifier, a subscription request message from a subscriber, and sending to the subscriber a notification message notifying of a current status of a subscribed event of the subscription request message when a permanent subscription identifier or a temporary subscription identifier corresponding to the subscribed event is valid.

Optionally, the subscriber carries the subscription identifier of the subscribed event in the subscription request message.

Optionally, the notifier sets for the subscribed event of the subscriber a subscription identifier corresponding to service characteristic of the subscribed event; or a service control node between the subscriber and the notifier sets for the subscribed event of the subscriber a subscription identifier corresponding to service characteristic of the subscribed event.

Optionally, the permanent subscription identifier or the temporary subscription identifier is carried in a response to the subscription request message or in the notification message received by the subscriber.

Optionally, if the subscribed event corresponds to the permanent subscription identifier, the notifier suspends sending the notification message when the subscriber gets offline, and resumes sending the notification message after the subscriber gets online.

Optionally, the permanent subscription is invalidated upon revocation of the subscription, and the temporary subscription is invalidated upon finishing of a service corresponding to the subscribed event.

Optionally, the permanent subscription identifier or the temporary subscription identifier of the subscribed event is carried in an extended existing header field of a session initiation protocol message or in an added header field of the session initiation protocol message.

Optionally, the extended existing header field may be an "Expires" header, a "Subscription-State" header, or an "Event" header.

Optionally, the permanent subscription identifier of the subscribed event is represented through not carrying a header field of valid period in the message.

Optionally, the temporary subscription identifier in the message is an identifier indicative of once or limited subscription.

Optionally, the subscription request message is a "SUBSCRIBE" message in the session initiation protocol; and the notification message is a "NOTIFY" message in the session initiation protocol.

A subscription method based upon the session initiation protocol is further provided, including:

initiating, by a subscriber to a notifier, a subscription request message including a first parameter indicative of a start time at which subscription gets validated and/or a second parameter indicative of a time at which a notification is sent; and receiving, by the notifier, the subscription request message, and sending a notification message to the subscriber after the time specified in the first parameter passes and/or dependent upon the time specified in the second parameter Here, the second parameter may include one or more times to send a notification.

Further in the method, the second parameter may include one or more intervals between sending of two adjacent notifications.

Further in the method, the first parameter and the second parameter are carried in an extended existing header field of a session initiation protocol message.

Further in the method, the extended existing header field may be an "Expires" header, a "Subscription-State" header, or an "Event" header, or any combination thereof.

Further in the method, the first parameter and the second parameter are carried in an added header field in a session initiation protocol message.

Further in the method, the subscription request message or a subscription revocation message is a "SUBSCRIBE" message in the session initiation protocol; and the notification message is a "NOTIFY" message in the session initiation protocol.

A device for implementing subscription is further provided, including:

a subscription identifier setting unit, adapted to set for a subscribed event a permanent subscription identifier or a temporary subscription identifier corresponding to service characteristic of the subscribed event; and a message constructing unit, adapted to generate a message carrying the permanent subscription identifier or the temporary subscription identifier set by the subscription identifier setting unit.

Optionally, the message generated by the message constructing unit is a subscription request message.

Optionally, the message generated by the message constructing unit is a notification message or a response message corresponding to a subscription request message.

Optionally, the message constructing unit carries the permanent subscription identifier or the temporary subscription identifier through an extended existing header field in the message; or the message constructing unit carries the permanent subscription identifier or the temporary subscription identifier through an added header field in the message; or the message constructing unit represents the permanent subscription identifier through not identifying a header field of valid period in the message.

A device for implementing subscription is further provided, including:

a subscription request message constructing unit, adapted to generate a subscription request message including a first parameter indicative of a start time at which subscription gets validated and/or a second parameter indicative of a time at which a notification is sent; and a subscription request message sending unit, adapted to send the subscription request message.

Optionally, the subscription request message constructing unit carries the first parameter and/or the second parameter through an extended existing header field in the message; or the subscription request message constructing unit carries the first parameter and/or the second parameter through an added header field in the message.

A device for implementing subscription is further provided, including:

a subscription request message receiving unit, adapted to receive a subscription request message including a first parameter indicative of a start time at which subscription gets validated and/or a second parameter indicative of a time at which a notification is sent; and a message sending unit, adapted to send a notification message or a response message corresponding to the subscription request message according to the first parameter and/or the second parameter.

The mechanism of temporary subscription and permanent subscription is introduced into the present invention. Upon reception of the SUBSCRIBE message, the notifier sets a temporary subscription flag or a permanent subscription flag for the subscriber according to the identifier carried in the message or the service characteristic corresponding to the subscribed event. In the case of the permanent subscription flag, a NOTIFY message from the notifier is continuously sent until the subscriber or the system revokes subscription. In the case of the temporary subscription flag, the notifier no longer sends a NOTIFY message upon finishing of the subscribed service.

The subscriber may identify an identifier of temporary subscription or permanent subscription in the SUBSCRIBE message sent to the notifier; or the notifier determines a subscription type according to service characteristic upon reception of normal subscription; or the service control node determines a subscription type according to service characteristic upon reception of normal subscription from the subscriber and then identifies an identifier of temporary subscription or permanent subscription in the SUBSCRIBE message relayed to the notifier.

The subscriber may carry a parameter indicative of a start time at which subscription gets validated and/or a parameter indicative of a time at which a notification is sent in the SUBSCRIBE message sent to the notifier. The notifier parses the message and sends the NOTIFY message after the start time at which subscription gets validated is reached and/or dependent upon the time at which a notification is sent.

In order to identify in an SIP message an identifier of temporary subscription or permanent subscription, a start time at which subscription gets validated, and a time at which a notification is sent, values for an existing header field (such as "Expires", "Subscription-State", and "Event") may be extended, or a new header field may be added.

Therefore, in the SIP protocol, by identifying permanent subscription or temporary subscription with some identifier, it is possible for a user to initiate such subscription without considering setting a specific value for the period of the subscription, or even without identifying permanent subscription or temporary subscription, thus simplifying the operations, and bringing a good service experience for the user. The permanent subscription flag will not be restricted by a lifetime period of a subscribed instance provided that the user terminal can store the permanent subscription flag, and the created permanent subscription is still valid after the user gets offline and then gets online again, thus bringing a good service experience for the user.

In the SIP protocol, by identifying a start time at which subscription gets validated and a time at which a notification is sent with some parameter in a subscription message, it is possible for the subscriber to create flexibly a time based subscription policy, thus bringing a good service experience for the user.

DETAILED DESCRIPTION OF THE INVENTION

The present invention will be further described in detail hereinafter with reference to the drawings to make objects, solutions and advantages of the present invention more apparent.

By identifying permanent subscription or temporary subscription with some identifier set in an SIP message, it is possible for a subscriber or a notifier to set a permanent subscription flag or a temporary subscription flag in a subscription instance according to the permanent subscription identifier or the temporary subscription identifier, and to handle an event permanently subscribed or temporarily subscribed according to the flag, without considering by a user setting a specific value for the period of subscription, and without reinitiating a subscription operation for permanent subscription after the user gets offline and then gets online again.

Figure 1:
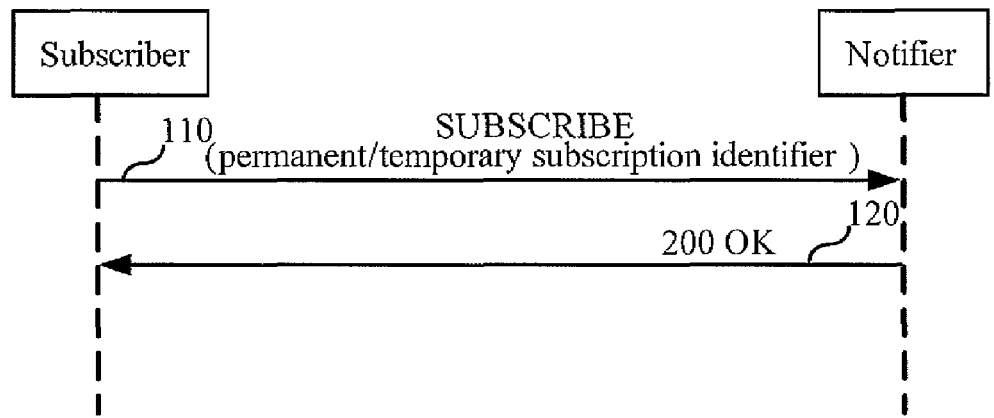
FIG. 1 is a flow diagram illustrating a method for temporary subscription and permanent subscription according to an embodiment of the present invention.

According to an embodiment of the present invention, as illustrated in FIG. 1, at 110, a subscriber initiates a subscription request via a SUBSCRIBE message. The subscriber determines initiation of permanent subscription or temporary subscription according to service characteristic of a subscribed event and then identifies permanent subscription or temporary subscription in the initiated subscription request. For example, a user with subscription to a voice message event wishes that a voice mail box would notify him of a new voice message when the voice mail box is valid. Therefore, the user identifies permanent subscription in the initiated subscription request. If the user subscribes to a malicious call tracing event that will be revoked automatically upon finishing the service, then the user identifies temporary subscription in the initiated subscription request. The subscriber can identify permanent subscription or temporary subscription in the initiated subscription request through an extended existing header field or a newly added header field. For example, permanent subscription or temporary subscription can be identified in the SIP subscription mechanism through extension of header fields of "Expires", "Subscription-State", or "Event".

For example, in the current SIP protocol, the format of the "Expires" header is as follows:

Expires="Expires" ":" (SIP-date|delta-seconds)

"SIP-date" parameter is a format for expressing date and time, and "delta-seconds" parameter is a non-negative integer in second, for example:

Expires: Thu, 1 Dec. 1994 16:00:00 GMT

Expires: 5

According to embodiments of the present invention, two values of "Permanent" and "Temporary" are added in the "Expires" header:

Expires: permanent

Expires: temporary

Then, permanent subscription or temporary subscription can be identified in the "Expires" header.

A value may also be added in the "Subscription-State" header. In the current SIP protocol, the format of "Subscription-State" header may be as follows:

Subscription-State = "Subscription-State" HCOLON substate-value
*( SEMI subexp-params )
substate-value = "active" / "pending" / "terminated" / extension-substate This header field is only used in a NOTIFY message sent from the notifier. Now three values for the "Subscription-State" header may be added, and the subscriber may also carry this header field in a sent SUBSCRIBE message so that the subscriber itself may identify permanent subscription or temporary subscription. The values may be defined as follows:

Subscription-State: normal
Subscription-State: permanent
Subscription-State: temporary There may also be added in the "Event" header a parameter descriptive of a subscription period attribute for a subscribed event, and this attribute is used to indicate whether the type of the subscribed event is normal subscription, permanent subscription or temporary subscription. In the current SIP protocol, the "Event" header is used to describe the type of a subscribed event, and the values for which may be defined as follows:

Event          = ( "Event" / "o" ) HCOLON event-type
*( SEMI event-param )
event-type     = event-package *( "." event-template )
event-package  = token-nodot
event-template = token-nodot
token-nodot    = 1*( alphanum / "-" / "!" / "%" / "*" / "_"
                 / "+" / "`" / "'" )
/ "~" )
event-param    = generic-param / ( "id" EQUAL token )

There are two parameters, "event-type" and optional "event-param", in the existing "Event" header. An optional parameter, "event-period", may be added into this header field, the values for which may be defined as follows:

event-period="normal"/"permanent"/"temporary"

Here, the absence of setting the "event-period" parameter in the "Event" header is equivalent to the parameter taking a value of "normal", i.e., a default value for the "event-period" parameter is "normal".

The subscriber may identify permanent subscription or temporary subscription through addition of a new header field in addition to extension of the existing header fields of "Expires", "Subscription-State", "Event", etc., in a SUBSCRIBE message. For example, a new "Periods" header may be added in the SIP protocol to describe a period attribute of a subscribed event, and the attribute is used to indicate whether the type of the subscribed event is normal subscription, permanent subscription or temporary subscription. The format of "Periods" header may be as follows:

Periods="Periods" HCOLON periods-value periods-value="normal"/"permanent"/"temporary"/token A value for the "periods-value" parameter can identify normal subscription, permanent subscription or temporary subscription.

It shall be noted that temporary subscription may be subdivided into once subscription and limited subscription no matter that the type of subscription is identified as normal subscription, permanent subscription or temporary subscription either through extension of the existing header fields of "Expires", "Subscription-State", "Event", etc., or through addition of a new header field. Here, once subscription indicates that a subscribed notification is sent only once from the notifier for a subscription request initiated from the subscriber, and limited subscription indicates that a subscribed notification is sent limited times such as once or more than once from the notifier for a subscription request initiated from the subscriber until the temporary subscription service is finished. For example, three values of permanent, once and limited are added in the "Expires" header:

Expires: permanent
Expires: once
Expires: limited

Temporary subscription may also be subdivided into once subscription and limited subscription in the existing header fields of "Subscription-State", "Event", etc., or in a newly added header field.

When the subscriber initiates a subscription request in a SUBSCRIBE message and identifies permanent subscription or temporary subscription in the subscription request, the flow goes to 120. Upon reception of the subscription request from the subscriber, the notifier parses and authenticates the subscription request, i.e., the notifier judges whether to agree with the subscriber to subscribe for the subscribed event. Also, the notifier sends a 200 OK response indicating that subscription is accepted and the user has been authorized to subscribe for the requested resource. And, the notifier sets for the subscriber a permanent subscription flag or a temporary subscription flag for the subscribed event according to the permanent subscription identifier or the temporary subscription identifier in the SUBSCRIBE message, and within the valid period of the flag, the notifier sends NOTIFY message notifying the subscriber of the current status of the subscribed event.

For example, the subscriber with subscription to a voice message event identifies permanent subscription in the initiated subscription request. Upon reception of the subscription request, the notifier parses and authenticates the subscription request, and sends a notification message via a NOTIFY message notifying the subscriber of the current status of the subscribed event, if only the set permanent subscription flag has not been invalidated.

Invalidation of the permanent subscription flag refers to that the notifier revokes the permanent subscription flag for the subscribed event, which is set for the subscriber, when the subscriber sends an SIP SUBSCRIBE message revoking subscription to the subscribed event, or the system revokes subscription to the subscribed event due to some reason (for example, the subscribing user revokes his account in the operator). If the subscriber with subscription to a malicious call tracing event identifies temporary subscription in the initiated subscription request, then upon reception of the subscription request, the notifier parses and authenticates the subscription request, and sends a notification message via a NOTIFY message notifying the subscriber of the current status of the subscribed event, if only the set temporary subscription flag has not been invalidated.

Invalidation of the temporary subscription flag refers to that if a distinction between once subscription and limited subscription is not made in the temporary subscription identifier; the notifier determines invalidation of the temporary subscription flag according to finishing of a service for the subscribed event; and if the distinction between once subscription and limited subscription is made in the temporary subscription identifier, then for the once subscription identifier, the notifier may revoke the once subscription flag after notifying once of the current status of the subscribed event, and for the limited subscription identifier, the notifier is still required to determine invalidation of the limited subscription flag according to finishing of the service for the subscribed event.

Here, for permanent subscription, the notifier may suspend (temporarily) sending NOTIFY message to saving system overhead when the subscriber gets offline. When the subscriber gets online again, no additional operation of the subscriber is required provided that the permanent subscription flag is still valid, and the notifier proceeds with sending a NOTIFY message to the subscriber. When the notifier knows that the subscriber gets online again, the notifier may send immediately a NOTIFY message notifying the subscriber if the status of the subscribed event changes between the last time that the subscriber gets offline and this time that the subscriber gets online; otherwise, the notifier will wait until the status of the subscribed event changes, and then notify the subscriber. In the present embodiment, by identifying permanent subscription or temporary subscription in the SIP subscription mechanism, it is possible for the subscriber to initiate such subscription without considering by the user setting a specific value for the period of subscription, and without reinitiating a subscription operation for permanent subscription after the user gets offline and then gets online again, thus simplifying the operations, and bringing a good service experience for the user.

Figure 2:
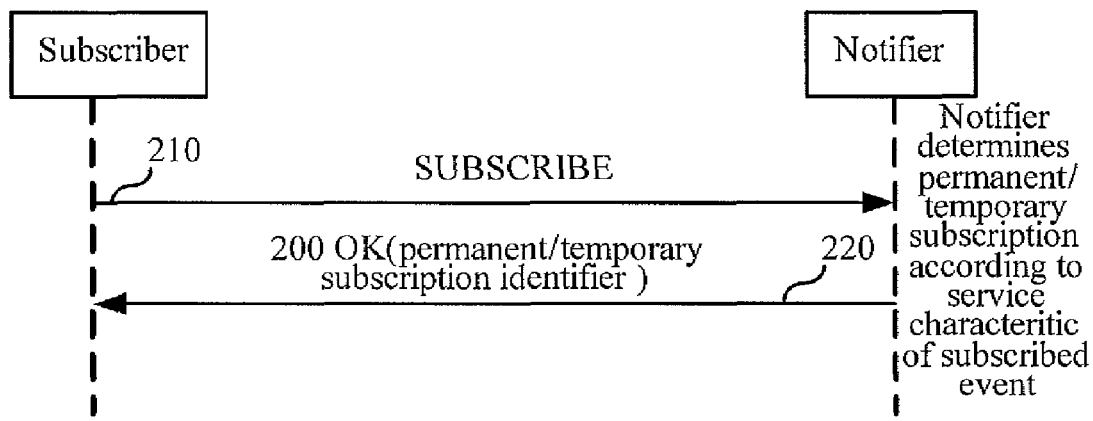
FIG. 2 is a flow diagram illustrating a method for temporary subscription and permanent subscription according to an embodiment of the present invention.

An embodiment of the present invention is as illustrated in FIG. 2. At 210, the subscriber initiates a normal subscription request via a SUBSCRIBE message. The subscriber may not be capable of initiating permanent subscription or temporary subscription or be unwilling to decide whether to initiate permanent subscription or temporary subscription. Therefore, it is not identified in the initiated SUBSCRIBE message whether the subscription request is for permanent subscription or for temporary subscription.

At 220, upon reception of the SUBSCRIBER message sent from the subscriber, the notifier parses and authenticates the subscription request, judges whether the subscription is permanent subscription or temporary subscription according to service characteristic of the subscribed event, and sets for the subscriber a permanent subscription flag or a temporary subscription flag for the subscribed event. Also the notifier sends to the subscriber a 200 OK response code indicating a permanent subscription identifier or a temporary subscription identifier. The identifiers have been detailed at 110 and will not be described again here.

For example, the initiated subscription request received by the notifier from the subscriber is a voice message event. The notifier determines that the subscription is permanent subscription according to service characteristic of the subscribed event, sets a permanent subscription flag for the subscribed event, and identifies a permanent subscription identifier in the sent 200 OK response code. After the notifier sets for the subscriber the permanent subscription flag or the temporary subscription flag for the subscribed event, within the valid period of the flag, the notifier sends a NOTIFY message notifying the subscriber of the current status of the subscribed event. Invalidation of the permanent subscription flag or the temporary subscription flag has been detailed at 120 and will not be described again here.

Upon reception of the 200 OK response code, the subscriber sets a permanent subscription flag or a temporary subscription flag for the subscribed event according to the permanent subscription identifier or the temporary subscription identifier in the 200 OK response code.

Figure 3:
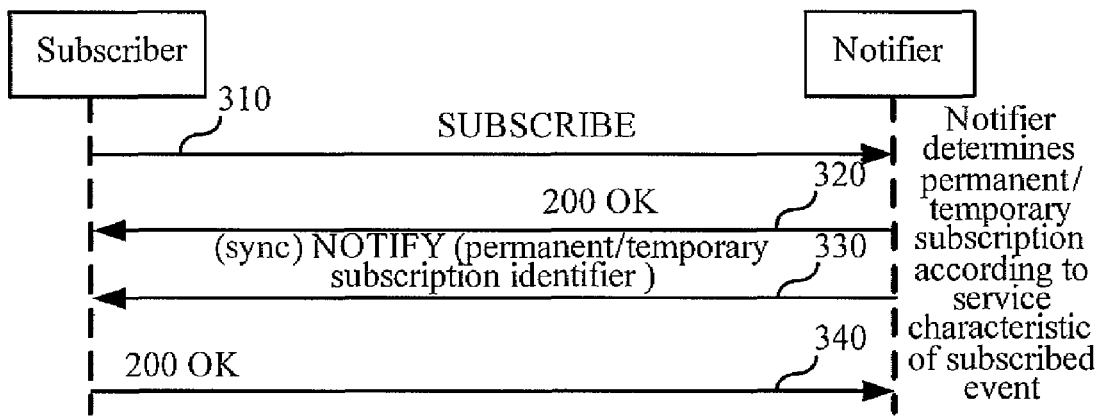
FIG. 3 is a flow diagram illustrating a method for temporary subscription and permanent subscription according to an embodiment of the present invention.

In comparison with the first embodiment, the present embodiment has such an effect that it is not necessary for the user to identify permanent subscription or temporary subscription, thus further simplifying the operations, and bringing a better service experience for the user. An embodiment of the present invention is as illustrated in FIG. 3. At 310, the subscriber initiates a normal subscription request. The subscriber may not be capable of initiating permanent subscription or temporary subscription or be unwilling to decide whether to initiate permanent subscription or temporary subscription. Therefore, it is not identified in a sent SUBSCRIBE message whether the subscription request is for permanent subscription or for temporary subscription.

At 320, upon reception of the SUBSCRIBER message sent from the subscriber, the notifier parses and authenticates the subscription request, and sends to the subscriber a 200 OK response code indicating that subscription is accepted and the user has been authorized to subscribe for the requested resource.

At 330, the notifier sends a NOTIFY message notifying the subscriber of the current status of the subscribed event, i.e. Snyc Notify, and identifies the permanent subscription identifier or the temporary subscription identifier in the notification. In accordance with the SIP protocol, upon reception of a SUBSCRIBE message, the notifier typically sends a NOTIFY message notifying the subscriber of the current status of the subscribed event, i.e. Snyc Notify, immediately. In the present embodiment, upon reception of the SUBSCRIBE message, the notifier parses and authenticates the message, judges whether the subscription is permanent subscription or temporary subscription according to service characteristic of the subscribed event, such as a voice message event or a malicious call tracing event, sets for the subscriber a permanent subscription flag or a temporary subscription flag for the subscribed event, and identifies a permanent subscription identifier or a temporary subscription identifier in the sent synchronous notification. The identifiers of permanent subscription or temporary subscription have been detailed at 110 and will not be described again here. The notifier sends a NOTIFY message notifying the subscriber of the current status of the subscribed event provided that the permanent subscription flag or the temporary subscription flag is valid. Invalidation of permanent subscription or temporary subscription has been detailed at 120 and will not be described again here.

At 340, upon reception of the NOTIFY message, the subscriber sets a permanent subscription flag or a temporary subscription flag for the subscribed event according to the permanent subscription identifier or the temporary subscription identifier in the NOTIFY message, and sends a 200 OK response code to the notifier.

Figure 4:
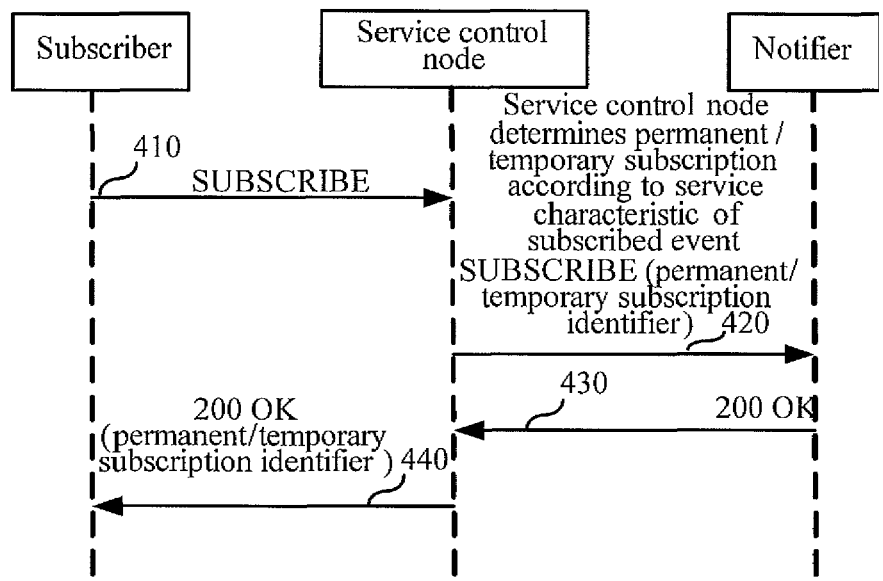
FIG. 4 is a flow diagram illustrating a method for temporary subscription and permanent subscription according to an embodiment of the present invention.

The effect in the present embodiment is the same as that in the second embodiment. An embodiment of the present invention is as illustrated in FIG. 4. At 410, the subscriber initiates a normal subscription request. The subscriber may not be capable of initiating permanent subscription or temporary subscription or be unwilling to decide whether to initiate permanent subscription or temporary subscription. Therefore, it is not identified in a sent SUBSCRIBE message whether the subscription request is for permanent subscription or for temporary subscription.

At 420, a service control node receives the SUBSCRIBE message, judges whether the subscription is permanent subscription or temporary subscription according to service characteristic of the subscribed event, identifies a permanent subscription identifier or a temporary subscription identifier in the SUBSCRIBE message sent from the subscriber, and proceeds with transmission of the SUBSCRIBE message to the notifier. The identifiers of permanent subscription or temporary subscription have been detailed at 110 and will not be described again here. Here, the service control node is a control node present between the subscriber and the notifier.

For example, the user terminal (subscriber) initiates a request for subscribing to a malicious call tracing event, and a malicious call tracing service is handled by a malicious call tracing control node. Then, the control node between the subscriber and the notifier is the malicious call tracing control node. The node determines that the subscription is temporary subscription according to service characteristic of the subscribed event. Since the node is not provided with the identifier of the user initiating the malicious call, the node further relays the subscription request to a network node which is aware of the identifier of the user at the calling side, and identifies the temporary subscription identifier in the subscription request.

At 430, upon reception of the subscription request initiated from the subscriber, the notifier sends a 200 OK response code to the subscriber.

At 440, the service control node relays the 200 OK response code to the subscription request, and identifies the permanent subscription identifier or the temporary subscription identifier in the response code. The identifiers have been detailed at 110 and will not be described again here.

Upon reception of the 200 OK response code, the subscriber sets a permanent subscription flag or a temporary subscription flag for the subscribed event according to the permanent subscription identifier or the temporary subscription identifier in the 200 OK response code.

The effect in the present embodiment is the same as that in the second embodiment.

Figure 5:
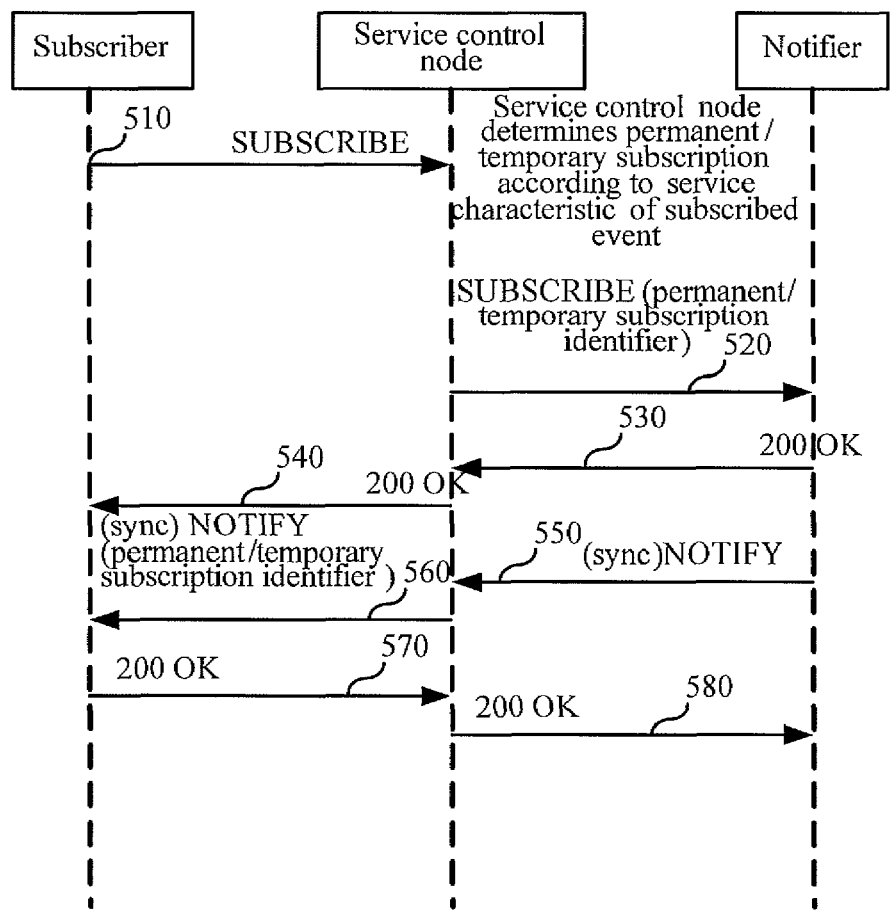
FIG. 5 is a flow diagram illustrating a method for temporary subscription and permanent subscription according to an embodiment of the present invention.

An embodiment of the present invention is as illustrated in FIG. 5. At 510, the subscriber initiates a normal subscription request. The subscriber may not be capable of initiating permanent subscription or temporary subscription or be unwilling to decide whether to initiate permanent subscription or temporary subscription. Therefore, it is not identified in a sent SUBSCRIBE message whether the subscription request is for permanent subscription or for temporary subscription.

At 520, a service control node receives the SUBSCRIBE message, judges whether the subscription is permanent subscription or temporary subscription according to service characteristic of the subscribed event, identifies a permanent subscription identifier or a temporary subscription identifier in the SUBSCRIBE message sent from the subscriber, and proceeds with transmission of the SUBSCRIBE message to the notifier. The identifiers of permanent subscription or temporary subscription have been detailed at 110 and will not be described again here.

At 530, upon reception of the subscription request initiated from the subscriber, the notifier sends a 200 OK response code to the subscriber.

At 540, the service control node relays the 200 OK response code sent from the notifier to the subscriber.

At 550, the notifier sends a NOTIFY message, notifying the subscriber of the current status of the subscribed event, i.e. a synchronous notification.

At 560, the service control node relays the synchronous notification sent from the notifier to the subscriber, and identifies the permanent subscription identifier or the temporary subscription identifier in the synchronous notification. The identifiers have been detailed at 110 and therefore will not be described again here.

At 570, upon reception of the NOTIFY message, the subscriber sets a permanent subscription flag or a temporary subscription flag for the subscribed event according to the permanent subscription identifier or the temporary subscription identifier in the NOTIFY message, and sends a 200 OK response code to the notifier.

At 580, the service control node relays the 200 OK response code sent from the subscriber to the notifier.

The effect in the present embodiment is the same as that in the second embodiment.

Further, even if the subscriber carries a permanent subscription identifier or a temporary subscription identifier in the SUBSCRIBE message, the notifier or the service control node may also carry the permanent subscription identifier or the temporary subscription identifier in the 200 OK response code or the NOTIFY message.

Further, in the embodiments above, permanent subscription is identified through extension of the header field of "Expires", "Subscription-State", "Event", or "Periods", and the extended parameter values can be regarded as an explicit permanent subscription identifier. Furthermore, permanent subscription may also be identified through not carrying the "Expires" header in a SUBSCRIBE message, i.e., not identifying a value for the valid period of subscription. This may be regarded as an implicit permanent subscription identifier, and of course in this case, the "Expires" header can not be carried in a returned NOTIFY message, either.

A sixth embodiment of the present invention involves time-policy-based subscription, which identifies a start time at which the subscription gets validated.

The subscriber initiates a subscription request, in which a start time at which subscript ion gets validated is identified, via a SUBSCRIBE message in the SIP. For example, what the subscriber wants to subscribe is the weather forecast of three days later, the subscription request is initiated on Jul. 18, 2005, and the valid period of the subscription is 5 days. Then, the subscriber would identify in the subscription request initiated via a SUBSCRIBE message that a start time at which subscription gets validated is Jul. 21, 2005. The subscriber may identify in the initiated subscription request a start time at which subscription gets validated through extension of an existing header field, i.e., through addition of a new optional parameter in the existing header field. The optional parameter may be represented as follows:

start-param="start-time" EQUAL (SIP-date)

Here, what the "start-time" identifies is a start time at which subscription gets validated.

For example, if the optional parameter is added in the "Expires" header, then for the above subscription request for a weather forecast, the parameter may be represented in the SUBSCRIBE message as follows:

Expires: Tues, 26 Jul. 2005 00:00:00 GMT;
start-time=Thu, 21 Jul. 2005 00:00:00 GMT;

The new optional parameter may also be added in the header field of "Subscription-State" or "Event" to identify a start time at which subscription gets validated. Alternatively, a new header field may also be added to carry the optional parameter.

Upon reception of the subscription request from the subscriber, the notifier parses and authenticates the subscription request. Thereafter, when the time at which subscription gets validated is reached, the notifier sends a notification message to the subscriber via a NOTIFY message in the SIP until the valid period of the subscription expires.

A seventh embodiment of the present invention involves time-policy-based subscription, which identifies a time at which a subscribed notification is sent.

The subscriber initiates a subscription request, in which a time at which a subscribed notification is sent is identified, via a SUBSCRIBE message in the SIP. For example, what the subscriber wants to subscribe is a weather forecast, the subscription request is initiated on Jul. 18, 2005, the valid period of the subscription is 5 days, and the subscriber wishes that a notification is sent at 8:00 every day during the valid period. Then, the subscriber identifies in the subscription request initiated via a SUBSCRIBE message that a time at which a subscribed notification is sent is 8:00 every day during the valid period. The subscriber may identify in the initiated subscription request a time at which a subscribed notification is sent through extension of an existing header field, i.e., through addition of a new optional parameter in the existing header field. The optional parameter may be represented as follows:

notify-param="notify-time" EQUAL (SIP-date)*(SEMI interval-param)

interval-param="interval" EQUAL (delta-seconds)

Here, what the "notify-time" identifies is a time at which a subscribed notification is sent, and what the "interval" identifies is an interval of time between two notifications.

For example, if the optional parameter is added in the "Expires" header, then for the above subscription request for a weather forecast, the parameter may be represented in the SUBSCRIBE message as follows:

Expires: Sat, 23 Jul. 2005 00:00:00 GMT;
notify-time=Mon, 18 Jul. 2005 08:00:00 GMT; interval=86400

Here, the parameter of interval with a value of 86400 indicates that the interval between notifications each time is one day after the first time at which a subscribed notification is sent has been reached. Indeed, the parameter of notify-time is allowed to carry multiple values for the notification time and multiple intervals of time. Therefore, a more complex notification time policy may be configured as follows:

notify-time=Mon, 18 Jul. 2005 08:00:00 GMT, Mon, 18 Jul. 2005 20:00:00 GMT;
interval=86400, Sat, 23 Jul. 2005 00:00:00 GMT The parameter above indicates that the first time at which a subscribed notification is sent is 8:00 on July 18, the second time is 20:00 on July 18, the interval between notifications each time is one day after the second time has been reached, and the last time is 0:00 on July 23.

The new optional parameter may also be added in the header field of "Subscription-State" or "Event" to identify a time at which a subscribed notification is sent. Alternatively, a new header field may also be added to carry the optional parameter.

Upon reception of the subscription request from the subscriber, the notifier parses and authenticates the subscription request. Then, according to the time at which a subscribed notification is sent in the SUBSCRIBE message, the notifier sends a notification message to the subscriber via a NOTIFY message in the SIP until the valid period of the subscription expires.

An eighth embodiment of the present invention involves time-policy-based subscription, which identifies a start time at which subscription gets validated and a time at which a subscribed notification is sent.

The subscriber initiates a subscription request, in which a start time at which subscription gets validated and a time at which a subscribed notification is sent are identified, via a SUBSCRIBE message in the SIP. For example, what the subscriber wants to subscribe is a weather forecast of three days later, the subscription request is initiated on Jul. 18, 2005, the valid period of the subscription is 5 days, and the subscriber wishes sending notification at 8:00 every day during the valid period. Then, the subscriber identifies in the subscription request initiated via a SUBSCRIBE message that a start time at which subscription gets validated is Jul. 21, 2005 and a time at which a subscribed notification is sent is 8:00 every day during the valid period. The subscriber may identify in the initiated subscription request a start time at which subscription gets validated and a time at which a subscribed notification is sent through extension of an existing header field, i.e., through addition of two new optional parameters in the existing header field. The two newly added optional parameters may be represented as follows:

```
start-param = "start-time" EQUAL (SIP-date)
notify-param = "notify-time" EQUAL (SIP-date) * (SEMI interval-param)
interval-param = "interval" EQUAL (delta-seconds)
```

Here, what the "start-time" identifies is a start time at which subscription gets validated, what the "notify-time" identifies is a time at which a subscribed notification is sent, and what the "interval" identifies is an interval between two notifications.

For example, if the two new optional parameters are added in the "Expires" header, then for the above subscription request for a weather forecast, the parameters may be represented in the SUBSCRIBE message as follows:

```
Expires: Tues, 26 Jul 2005 00:00:00 GMT;
    start-time = Thu, 21 Jul 2005 00:00:00 GMT;
    notify-time = Thu, 21 Jul 2005 08:00:00 GMT ; interval = 86400
```

Here, the parameter of interval with a value of 86400 indicates that the interval between notifications each time is one day after the first time at which a subscribed notification is sent has been reached.

The two new optional parameters may also be added in the header field of "Subscription-State" or "Event" or any combination thereof to identify a start time at which subscription gets validated and a time at which a subscribed notification is sent. Alternatively, a new header field may also be added to carry the two optional parameters.

Upon reception of the subscription request from the subscriber, the notifier parses and authenticates the subscription request. Thereafter, when the time at which subscription gets validated is reached, according to the time at which a subscribed notification is sent in the SUBSCRIBE message, the notifier sends a notification message to the subscriber via a NOTIFY message in the SIP until the valid period of the subscription expires.

Figure 6:
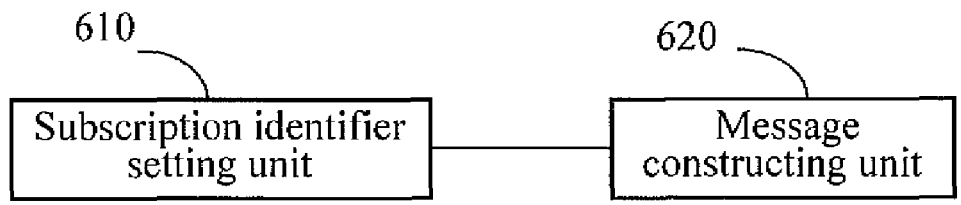
FIG. 6 is a block diagram illustrating a device for implementing subscription according to an embodiment of the present invention.

With reference to FIG. 6, a device for implementing subscription according to embodiments of the present invention includes:

a subscription identifier setting unit 610, adapted to set for a subscribed event a permanent subscription identifier or a temporary subscription identifier corresponding to service characteristic of the subscribed event; and a message constructing unit 620, adapted to generate a message carrying the permanent subscription identifier or the temporary subscription identifier set by the subscription identifier setting unit.

For the device for implementing subscription at a subscriber side, the message generated by the message constructing unit 620 is a subscription request message.

For the device for implementing subscription at a notifier side, the message generated by the message constructing unit 620 is a notification message or a response message corresponding to a subscription request message.

Specifically, the message constructing unit 620 carries the permanent subscription identifier or the temporary subscription identifier through extension of an existing header field in an SIP message; or the message constructing unit 620 carries the permanent subscription identifier or the temporary subscription identifier through addition of a new header field in an SIP message; or the message constructing unit 620 represents the permanent subscription identifier through not identifying the valid period of the header field in the message. The operation procedure is substantially the same as those in the method embodiments above and will not be described again here.

Figure 7:
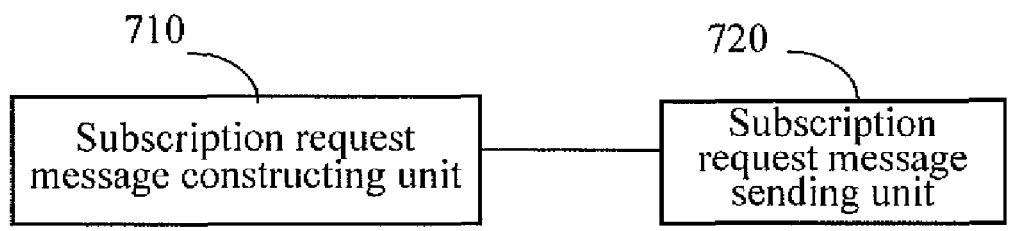
FIG. 7 is a block diagram illustrating a device for implementing subscription according to another embodiment of the present invention.

A device for implementing subscription according to embodiments of the present invention may achieve time-policy-based subscription. With reference to FIG. 7, a device for implementing subscription at a subscriber side according to an embodiment of the present invention includes:

a subscription request message constructing unit 710, adapted to generate a subscription request message including a first parameter indicative of a start time at which subscription gets validated and/or a second parameter indicative of a time at which a notification is sent; and a subscription request message sending unit 720, adapted to send the subscription request message.

Here, the subscription request message constructing unit 710 carries the first parameter and/or the second parameter through extension of an existing header field in an SIP message; or the subscription request message constructing unit 710 carries the first parameter and/or the second parameter through addition of a header field in an SIP message.

Figure 8:
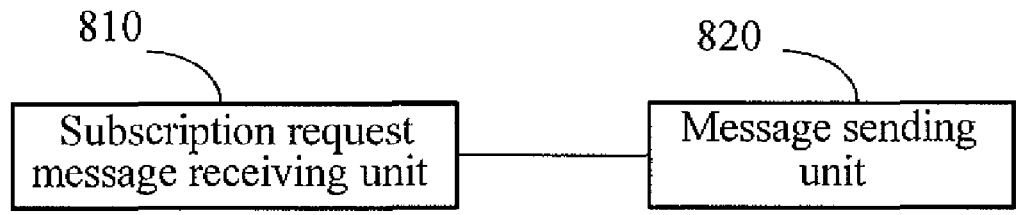
FIG. 8 is a block diagram illustrating a device for implementing subscription according to still another embodiment of the present invention.

With reference to FIG. 8, a device for implementing subscription at a notifier side according to an embodiment of the present invention includes:

a subscription request message receiving unit 810, adapted to receive a subscription request message including a first parameter indicative of a start time at which subscription gets validated and/or a second parameter indicative of a time at which a notification is sent; and a message sending unit 820, adapted to send a notification message or a response message corresponding to the subscription request message according to the first parameter and/or the second parameter.

Although the present invention has been illustrated and described with reference to some preferred embodiments of the present invention, those ordinarily skilled in the art shall appreciate that various variations can be made to those embodiments in the forms and details without departing from the spirit and scope of the present invention.

What is claimed is:

1. A subscription method, comprising:
    receiving, by a notifier, a subscription request message from a subscriber, and sending to the subscriber a notification message notifying of a current status of a subscribed event of the subscription request message when a permanent subscription identifier or a temporary subscription identifier corresponding to the subscribed event is valid.

2. The subscription method according to claim 1, wherein the subscriber sets for the subscribed event the permanent subscription identifier or the temporary subscription identifier, and carries the subscription identifier of the subscribed event in the subscription request message, and the notifier sets for the subscribed event the permanent subscription identifier or the temporary subscription identifier according to the subscription identifier in the subscription request message.

3. The subscription method according to claim 1, wherein the notifier sets for the subscribed event of the subscriber the permanent subscription identifier or the temporary subscription identifier corresponding to service characteristic of the subscribed event after receiving the subscription request message from the subscriber.

4. The subscription method according to claim 1, wherein a service control node between the subscriber and the notifier sets for the subscribed event of the subscriber the permanent subscription identifier or the temporary subscription identifier corresponding to service characteristic of the subscribed event after receiving the subscription request message from the subscriber, and relays the subscription request message to the notifier, and the notifier sets for the subscribed event the permanent subscription identifier or the temporary subscription identifier according to the subscription identifier in the subscription request message.

5. The subscription method according to claim 3, wherein the permanent subscription identifier or the temporary subscription identifier is carried in a response to the subscription request message or in the notification message received by the subscriber.

6. The subscription method according to claim 5, wherein the subscriber need not reinitiate a subscription operation for permanent subscription after the subscriber gets offline and then gets online again.

7. The subscription method according to claim 1, wherein if the subscribed event corresponds to the permanent subscription identifier, the notifier suspends sending the notification message when the subscriber gets offline, and resumes sending the notification message after the subscriber gets online.

8. The subscription method according to claim 1, wherein the permanent subscription is invalidated upon revocation of the subscription, and the temporary subscription is invalidated upon finishing of a service corresponding to the subscribed event.

9. The subscription method according to claim 1, wherein the permanent subscription identifier or the temporary subscription identifier of the subscribed event is carried in an extended existing header field of a session initiation protocol message or in an added header field of the session initiation protocol message,
wherein the subscription request message is a "SUBSCRIBE" message in the session initiation protocol; and the notification message is a "NOTIFY" message in the session initiation protocol.

10. The subscription method according to claim 1, wherein:
the permanent subscription identifier of the subscribed event is represented through not carrying a header field of valid period in the subscription request message.

11. The subscription method according to claim 1, wherein the temporary subscription identifier in the subscription request message is an identifier indicative of once or limited subscription.

12. A subscription method, comprising:
initiating, by a subscriber to a notifier, a subscription request message including a first parameter indicative of a start time at which the subscription gets validated and/or a second parameter indicative of a time at which a notification is sent; and receiving, by the notifier, the subscription request message, and sending a notification message to the subscriber when the time specified in the first parameter is reached and/or according to the time specified in the second parameter.

13. The subscription method according to claim 12, wherein the second parameter comprises one or more times at which the notification is sent.

14. The subscription method according to claim 12, wherein the second parameter comprises one or more intervals of time between sending of two adjacent notifications.

15. The subscription method according to claim 12, wherein the first parameter and/or the second parameter are carried in an extended existing header field in a session initiation protocol message or in an added header field in a session initiation protocol message,
wherein the subscription request message is a "SUBSCRIBE" message in the session initiation protocol; and the notification message is a "NOTIFY" message in the session initiation protocol.

16. A device for implementing subscription, comprising:
a subscription identifier setting unit, adapted to set for a subscribed event a permanent subscription identifier or a temporary subscription identifier corresponding to service characteristic of the subscribed event; and
a message constructing unit, adapted to generate a message carrying the permanent subscription identifier or the temporary subscription identifier set by the subscription identifier setting unit.

17. The device for implementing subscription according to claim 16, wherein the message generated by the message constructing unit is a subscription request message.

18. The device for implementing subscription according to claim 16, wherein the message generated by the message constructing unit is a notification message or a response message corresponding to a subscription request message.

19. The device for implementing subscription according to claim 16, wherein the message constructing unit carries the permanent subscription identifier or the temporary subscription identifier either through extension of an existing header field in the message or through an added header field in the message.

20. The device for implementing subscription according to claim 16, wherein the message constructing unit represents the permanent subscription identifier through not identifying a header field of valid period in the message 21. A device for implementing subscription, comprising:
a subscription request message constructing unit, adapted to generate a subscription request message including a first parameter indicative of a start time at which subscription gets validated and/or a second parameter indicative of a time at which a notification is sent; and
a subscription request message sending unit, adapted to send the subscription request message.

22. The device for implementing subscription according to claim 21, wherein the subscription request message constructing unit carries the first parameter and/or the second parameter through extension of an existing header field in the subscription request message; or the subscription request message constructing unit carries the first parameter and/or the second parameter through an added header field in the subscription request message.

23. A device for implementing subscription, comprising:
a subscription request message receiving unit, adapted to receive a subscription request message including a first parameter indicative of a start time at which subscription gets validated and/or a second parameter indicative of a time at which a notification is sent; and a message sending unit, adapted to send a notification message or a response message corresponding to the subscription request message according to the first parameter and/or the second parameter.

* * * * *